United States Patent
Cui

(10) Patent No.: US 11,609,598 B2
(45) Date of Patent: Mar. 21, 2023

(54) NETWORK CARD, TIME SYNCHRONIZATION METHODS AND DEVICES, AND COMPUTER STORAGE MEDIA

(71) Applicant: ZTE CORPORATION, Guangdong (CN)

(72) Inventor: Xiangwu Cui, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 101 days.

(21) Appl. No.: 17/264,901

(22) PCT Filed: Aug. 15, 2019

(86) PCT No.: PCT/CN2019/100749
§ 371 (c)(1),
(2) Date: Feb. 1, 2021

(87) PCT Pub. No.: WO2020/057303
PCT Pub. Date: Mar. 26, 2020

(65) Prior Publication Data
US 2021/0303021 A1     Sep. 30, 2021

(30) Foreign Application Priority Data

Sep. 20, 2018   (CN) .......................... 201811102873.8

(51) Int. Cl.
*G06F 9/455* (2018.01)
*H04L 7/033* (2006.01)
*G06F 1/12* (2006.01)

(52) U.S. Cl.
CPC ............ *G06F 1/12* (2013.01); *G06F 9/45558* (2013.01); *H04L 7/033* (2013.01); *G06F 2009/45595* (2013.01)

(58) Field of Classification Search
CPC ............ G06F 2009/45595; G06F 1/12; G06F 9/45558; H04L 7/033; H04L 7/0331; H04J 3/0667
See application file for complete search history.

(56) References Cited

U.S. PATENT DOCUMENTS

| | | | |
|---|---|---|---|
| 9,344,265 B2 * | 5/2016 | Karnes | H04L 12/4641 |
| 10,944,818 B1 * | 3/2021 | Izenberg | H04L 43/067 |
| 2007/0061605 A1 | 3/2007 | Engler et al. | |
| 2009/0276542 A1 * | 11/2009 | Aweya | H03L 7/08 709/248 |

(Continued)

FOREIGN PATENT DOCUMENTS

| | | | |
|---|---|---|---|
| CN | 104615549 A | 5/2015 | |
| CN | 107247616 A | 10/2017 | |

(Continued)

OTHER PUBLICATIONS

European Patent Office, EP19863839.7 Extended European Search Report dated May 17, 2022.

(Continued)

*Primary Examiner* — Frantz B Jean
(74) *Attorney, Agent, or Firm* — Li & Cai Intellectual Property (USA) Office

(57) ABSTRACT

The present application discloses a network card, time synchronization methods and devices, and computer storage media. The network card includes: a crystal oscillator configured to generate a clock pulse signal; a phase-locked loop configured to provide a local clock source for the network card according to the clock pulse signal; and a connector connected with a host. The network card transmits synchronized time information to each of N VMs, which are run on the host, through a shared channel, where N≥2.

17 Claims, 10 Drawing Sheets

(56) References Cited

U.S. PATENT DOCUMENTS

| | | | |
|---|---|---|---|
| 2013/0275971 A1 | 10/2013 | Kruglick | |
| 2015/0153000 A1* | 6/2015 | Clinton | F16M 13/027 |
| | | | 248/333 |
| 2015/0356031 A1 | 12/2015 | Gintis | |
| 2015/0381299 A1* | 12/2015 | Yang | H04L 7/0331 |
| | | | 375/376 |
| 2018/0203803 A1 | 7/2018 | Compton et al. | |
| 2019/0327010 A1* | 10/2019 | Wang | H04W 56/001 |
| 2019/0349392 A1* | 11/2019 | Wetterwald | H04L 43/0852 |
| 2020/0064859 A1* | 2/2020 | Zhang | G05D 1/0231 |

FOREIGN PATENT DOCUMENTS

| | | | |
|---|---|---|---|
| JP | 2003036123 | A | 2/2003 |
| JP | 2006071441 | A | 3/2006 |
| JP | 2007080264 | A | 3/2007 |
| JP | 2012079143 | A | 4/2012 |
| JP | 2013069236 | A | 4/2013 |
| JP | 2013145460 | A | 7/2013 |
| JP | 2018088646 | A | 6/2018 |

OTHER PUBLICATIONS

D'souza Sandeep, et al., "Quartz V Bringing Quality of Time to Virtual Machines", 2018 IEEE Realtime and Embedded Technology and Application Sympoasium, IEEE, Apr. 11, 2018, pp. 49-61.

WIPO, International Search Report dated Oct. 14, 2019.

Tomoaki, et al., "A Time-aware Control Method Using High Precision Time Synchronization" issued on Jul. 18, 2014.

"Meinberg Radio Clocks GmbH & Co.KG" issued on Nov. 22, 2012.

Japan Patent Office, First Office Action dated Jun. 22, 2021 regarding JP2020-547281 and the English translation thereof.

Tomoaki, et al., "A Time-aware Control Method Using High Precision Time Synchronization", Mobile ( DICOMO2014 ) Symposium series vol. 2014 No. 1 , Series of Procedures society, issued on Jul. 18, 2014.

"Meinberg Radio Clocks GmbH & Co.KG", IEEE1588 Computer Clock, Nov. 22, 2012, https://www.manualslib.com/manual/803552/Meinberg / Ptp270pex.html.

Japan Patent Office, JP2020-547281 Decision of Rejection dated Nov. 30, 2021 and the English translation thereof.

* cited by examiner

NETWORK CARD, TIME SYNCHRONIZATION METHODS AND DEVICES, AND COMPUTER STORAGE MEDIA

CROSS-REFERENCE TO RELATED APPLICATIONS

This is a National Phase Application file under 35 U.S.C. 371 as a national stage of PCT/CN2019/100749, filed on Aug. 15, 2019, an application claiming the priority of Chinese Patent Application No. 201811102873.8, filed Sep. 20, 2018, the contents of which are incorporated herein in their entirety by reference.

TECHNICAL FIELD

The present application relates to, but is not limited to, the field of time synchronization.

BACKGROUND

A virtual machine (VM) refers to a complete computer system implemented by means of software emulation, the computer system having complete hardware system functions and operating in a complete isolation environment.

Clock interrupts in the VM are emulated, and there is no guarantee that the clock interrupts precisely occur on time. At present, system time synchronization of VMs is implemented through transmission using Network Time Protocol (NTP), and the time transmission accuracy is low.

SUMMARY

The embodiments of the present application provide a network card, including a crystal oscillator, a phase-locked loop and a connector. The crystal oscillator and the phase-locked loop provide a local clock source for the network card. The crystal oscillator and the phase-locked loop are in signal interconnection, the crystal oscillator generates and outputs a clock pulse signal to the phase-locked loop, and the phase-locked loop generates a local clock source according to the clock pulse signal and provides the local clock source for the network card to use. The connector is connected with a slot of a host (e.g., a physical server) and the host itself. The network card transmits synchronized time information to each of a plurality of VMs, which are run on the host, through a shared channel. The plurality of VMs are run on the host, and perform their respective time synchronization and correction according to the synchronized time information fed back by the host. The shared channel may be shared through software. In the cases where the shared channel is shared through software, the synchronized time information is transmitted to each VM through a shared memory channel which connects the host to each VM, and the network card hardware does not change. On the other hand, the shared channel may be shared through hardware. In the cases where the shared channel is shared through hardware, a programmable logic device having a plurality of processors (such as a message transceiving processor, a time maintenance processor, a time adjustment processor, and a time synchronization processor) is added to the network card, so that time update information is processed by the processors and is transmitted to each VM as the synchronized time information, and the network card hardware changes. By sharing the shared channel between the host and each VM through the network card hardware, the synchronized time information is transmitted to each VM.

The embodiments of the present application provide a time synchronization method applied to a host on which a plurality of VMs are run. The host transmits synchronized time information to each of the VMs through a shared channel, so that the VMs perform their respective time synchronization and correction according to the synchronized time information fed back by the host.

The embodiments of the present application provide a time synchronization method applied to each of a plurality VMs which are run on a host. The method includes: receiving synchronized time information which is transmitted to each VM by the host through a shared channel; and correcting local system time in each VM according to the synchronized time information fed back by the host.

The embodiments of the present application provide a time synchronization device applied to a host on which a plurality of VMs are run. The device includes: a synchronization unit configured to transmit synchronized time information to each of the VMs through a shared channel, so as to enable the VMs to perform their respective time synchronization and correction according to the synchronized time information fed back by the host.

The embodiments of the present application provide a time synchronization device applied to each of a plurality VMs which are run on a host. The device includes: a receiving unit configured to receive synchronized time information which is transmitted to each VM by the host through a shared channel; and a correcting unit configured to correct local system time in each VM according to the synchronized time information.

The embodiments of the present application provide a time synchronization device, including: a memory having a computer program stored therein, and a processor configured to execute the computer program to perform the time synchronization methods according to the present application.

The embodiments of the present application provide a computer storage medium having a computer program stored therein. When the computer program is executed by a processor, the processor performs the time synchronization methods according to the present application.

BRIEF DESCRIPTION OF THE DRAWINGS

The drawings generally illustrate, but not limit, the embodiments discussed herein. In the drawings.

DETAILED DESCRIPTION

The present application is further described in detail below with reference to the drawings and embodiments. It should be understood that the embodiments provided herein are merely for explaining the present application, but are not intended to limit the present application. In addition, the embodiments provided below are some of the embodiments of the present application, but are not all of the embodiments of the present application. The technical solutions described in the embodiments of the present application may be implemented in any combination if no conflict is incurred.

It should be noted that, in the embodiments of the present application, the terms "includes", "comprises" or any other variation thereof are intended to indicate a non-exclusive inclusion, so that a method or device, which includes a series of elements, not only includes those explicitly listed elements, but also includes other elements which are not explicitly listed, or the elements inherent for implementing such method or device. If there are no more limitations, limiting an element by "including . . . " does not exclude the existence of other related elements in the method or device which includes the element (for example, steps in a method or units in a device, and the units may be part of circuits, part of processors, or part of programs or software, etc.).

For example, the time synchronization methods provided in the embodiments of the present application include a series of steps, but the time synchronization methods provided in the embodiments of the present application are not limited to the described steps. Similarly, the network card and the time synchronization devices provided in the embodiments of the present application include a series of components and units, but the network card and the time synchronization devices provided in the embodiments of the present application are not limited to including the explicitly described components and units, and may further include the units required for acquiring related information or performing processing based on information.

It should be noted that the terms "first", "second" and the like used in the embodiments of the present application are only for distinguishing between similar objects, and do not represent a particular order of the objects. It should be understood that the objects distinguished by "first", "second" and the like may be interchanged under appropriate circumstances, so that the embodiments of the present application described herein are capable of being implemented in orders other than those described or illustrated herein.

Figure 1:
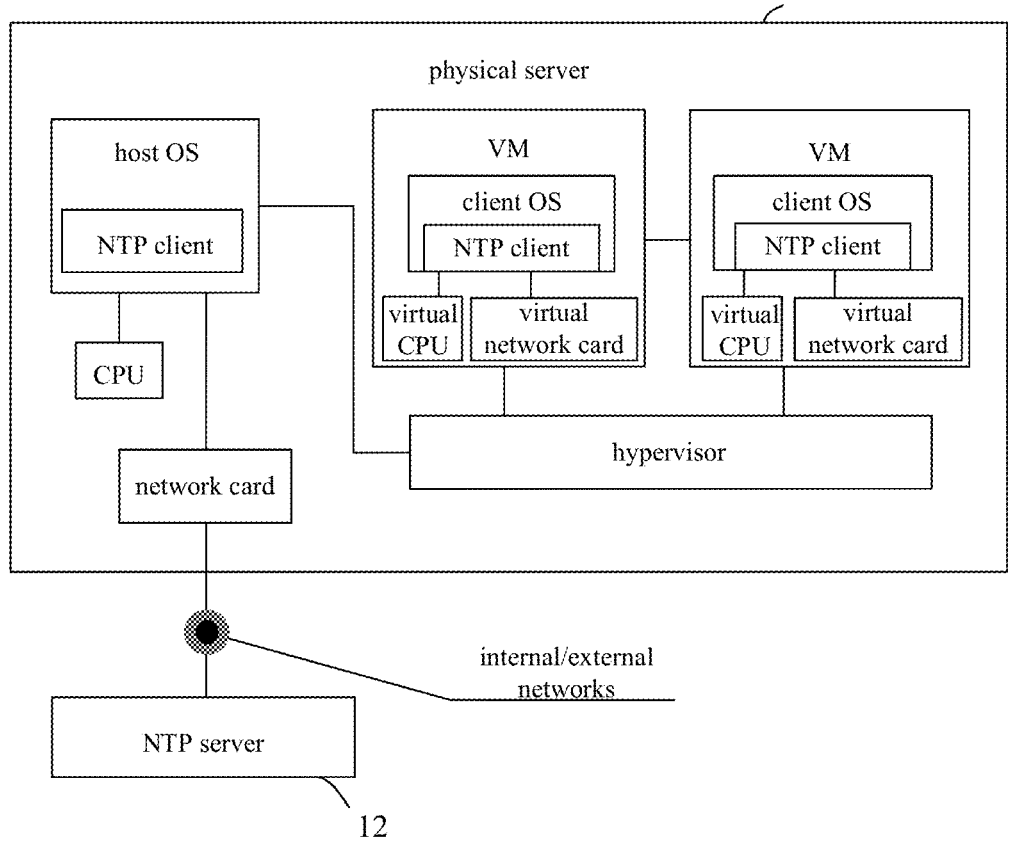
FIG. 1 is a schematic diagram illustrating a method of synchronizing time by using NTP in a VM.

FIG. 1 is a schematic diagram illustrating a method of synchronizing time by using NTP in a VM. In FIG. 1, one or more virtual computers can be emulated on a physical server 11 by VM software, that is, running a plurality of VMs on the physical server 11, and enabling the VMs to operate like real computers, for example, operating systems and applications are installed in the VMs, and network resources are accessed via the VMs. The physical server 11 and an NTP server 12 perform message interaction by using NTP. The NTP is a protocol for synchronizing time of computers, and can allow the computers to synchronize with an NTP server or a clock source (e.g., a quartz clock, GPS, etc.) so as to provide time correction. A physical server on which a plurality of VMs are run may also be referred to as a host or a physical host.

Clock interrupts in a VM are emulated, cannot be guaranteed to precisely occur on time, and may be delayed. Moreover, the processing of the clock interrupts is not "preemptive" and can only be performed when the VM system is run. Therefore, the system time in the VM is affected by both of clock source accuracy and software scheduling of the physical host. At present, system time synchronization of VMs is implemented through transmission using the NTP. However, the NTP can only achieve time transmission accuracy of millisecond (ms) level, and the time transmission accuracy is low.

By using the network card (which may be deployed in a slot of a host) of the embodiments of the present application to transmit synchronized time information to each of N (N≥2) VMs which are run on the host through a shared channel, the problem of low time transmission accuracy may be solved. The host may be a physical server and the network card may be deployed in a slot of the server, for example, a peripheral component interconnect express (PCIE) slot. PCIE is high-speed serial point-to-point double-channel high-bandwidth transmission, the connected devices are allocated exclusive channel bandwidth and do not share bus bandwidth, and PCIE mainly supports functions of active power management, error reporting, end-to-end reliable transmission, hot plugging, and service quality.

Figure 2:
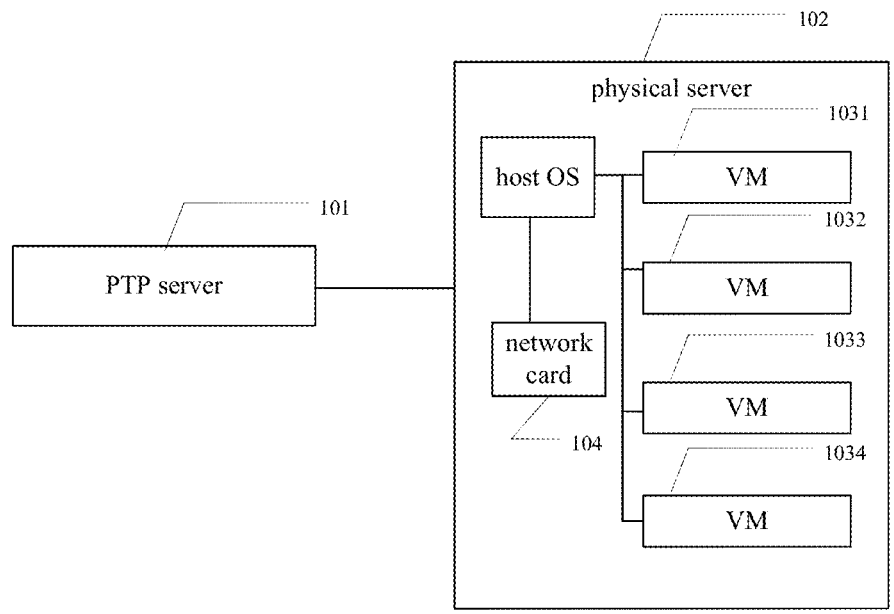
FIG. 2 is an architecture diagram of an application scenario according to the embodiments of the present application.

FIG. 2 is an architecture diagram of an application scenario according to the embodiments of the present application.

As shown in FIG. 2, a physical server 102 is a host, and runs a host operating system (OS). The physical server 102 and a PTP server 101 perform message interaction by using PTP. The time synchronization implemented through transmission using the NTP can only achieve the time transmission accuracy of microsecond (ms) level, which is far from enough for nanosecond (ns) level time accuracy required by high-precision time synchronization. A clock adopting IEEE 1588 V2 protocol is a high-precision clock, and has the advantages of bidirectional channel, ns-level accuracy, low cost, adaptability to different access environments, etc. For 5G scenarios, ultra-reliable and low-latency services are one of 5G subdivided applications, and are considered in new service trends such as automatic driving and industrial control, all of those service trends have high requirements for latency, and the services may be deployed in VMs or containers when network infrastructure is gradually replaced with general purpose servers in the future. Therefore, it is necessary to achieve high-precision time synchronization in the VMs by using the IEEE 1588 V2 protocol. In an embodiment of the present application, the IEEE 1588 V2 protocol is adopted, and a system composed of the physical server 102 and the PTP server 101 and based on an IEEE 1588 V2 clock acts as a master-slave synchronization system. In a synchronization process of the system, a master clock transmits PTP and time information periodically, a slave clock port receives timestamp information transmitted via the master clock port, the system calculates a delay of master-slave line and a master-slave time deviation according to the timestamp information, and adjusts local time by using the time deviation, so as to keep the time of the slave at the same frequency and phase as the time of the master.

The PTP achieves more accurate time synchronization through cooperation of hardware and software. A clock port hardware device (such as a network card) needs to support adding timestamp information to PTP synchronization messages. SR-IOV technology is a virtualization solution based on hardware, and can improve performance and scalability. SR-IOV standard allows efficient sharing of fast peripheral component interconnect, such as PCIE, among VM clients, and it is implemented by hardware, and can achieve high I/O performance. SR-IOV network devices define virtual function (VF) modules, each of which may be used as an independent network card, and those virtual functions are generally incorporated into the VM clients through PCIE passthrough. In a design of standard network card, a time synchronization function is not supported in the VF modules, and can be performed only in a single physical function (PF) module. However, the number of the PF modules is limited, so that only a few VM modules may synchronize time by using the PTP, which results in low time synchronization accuracy of the VMs.

The PTP can synchronize clocks of various devices through Ethernet so as to achieve higher synchronization accuracy. A plurality of VMs are run on the physical server 102, and FIG. 2 shows a plurality of VMs 1031 to 1034. Although each VM is a virtualized computer, it can operate like a real computer, such as installing an operating system, installing applications, and accessing network resources. A network card is deployed in a slot (e.g., a PCIE slot) of the physical server 102, and is configured to identify PTP messages transmitted and received between the physical server 102 and the PTP server 101, and transmit updated time synchronization information to each VM, so that time synchronization and update may be realized in the plurality of VMs, with the accuracy improved.

Based on the above description of the embodiments of the present application, the network card, the time synchronization methods and the time synchronization devices provided by the embodiments of the present application are described below.

According to an embodiment of the present application, a network card includes: a crystal oscillator configured to generate a clock pulse signal; a phase-locked loop configured to provide a local clock source for the network card according to the clock pulse signal; and a connector configured to be connected with a host. The network card may further include a programmable logic device, such as a Field-Programmable Gate Array (FPGA), which is configured to transmit synchronized time information to each of N (N≥2) VMs, which are run on the host, through a shared channel.

It should be noted that, in the cases where the shared channel is shared through software, the synchronized time information may be transmitted to each VM through a shared memory channel which connects the host to each VM, and the network card hardware does not change; and in the cases where the shared channel is shared through hardware, a programmable logic device having a plurality of processors (such as a message transceiving processor, a time maintenance processor, a time adjustment processor, and a time synchronization processor) is added to the network card, so that time update information is processed by the processors and is transmitted to each VM as the synchronized time information.

Figure 3:
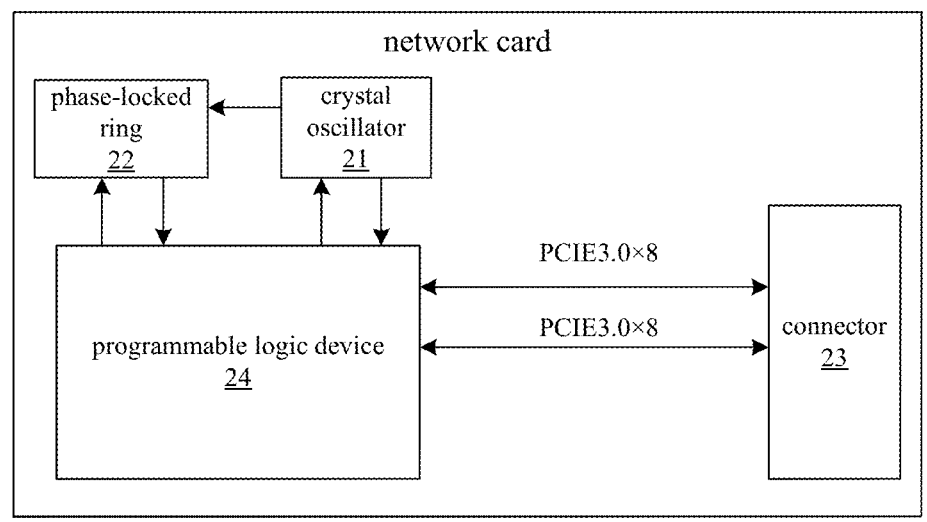
FIG. 3 is a schematic diagram of a network card according to an embodiment of the present application.

FIG. 3 is a schematic diagram of the network card in the cases where the shared channel is shared through hardware. The network card includes a crystal oscillator 21, a phase-locked loop 22 and a connector 23. The crystal oscillator 21 and the phase-locked loop 22 provide a local clock source for the network card. The crystal oscillator 21 and the phase-locked loop 22 are in signal interconnection, the crystal oscillator 21 generates and outputs a clock pulse signal to the phase-locked loop 22, and the phase-locked loop 22 generates the local clock source according to the clock pulse signal and provides the local clock source for the network card to use. The connector 23 is connected with a slot of a host (e.g., the physical server in FIG. 2) and the host itself. The network card may further include a programmable logic device 24, which is configured to share a shared channel between the host and each VM through the network card hardware so as to transmit synchronized time information to each VM. The change of the network card hardware will be illustrated in detail with reference to FIG. 6. A plurality of VMs are run on the host, and perform their respective time synchronization and correction according to the synchronized time information fed back by the host.

Figure 4:
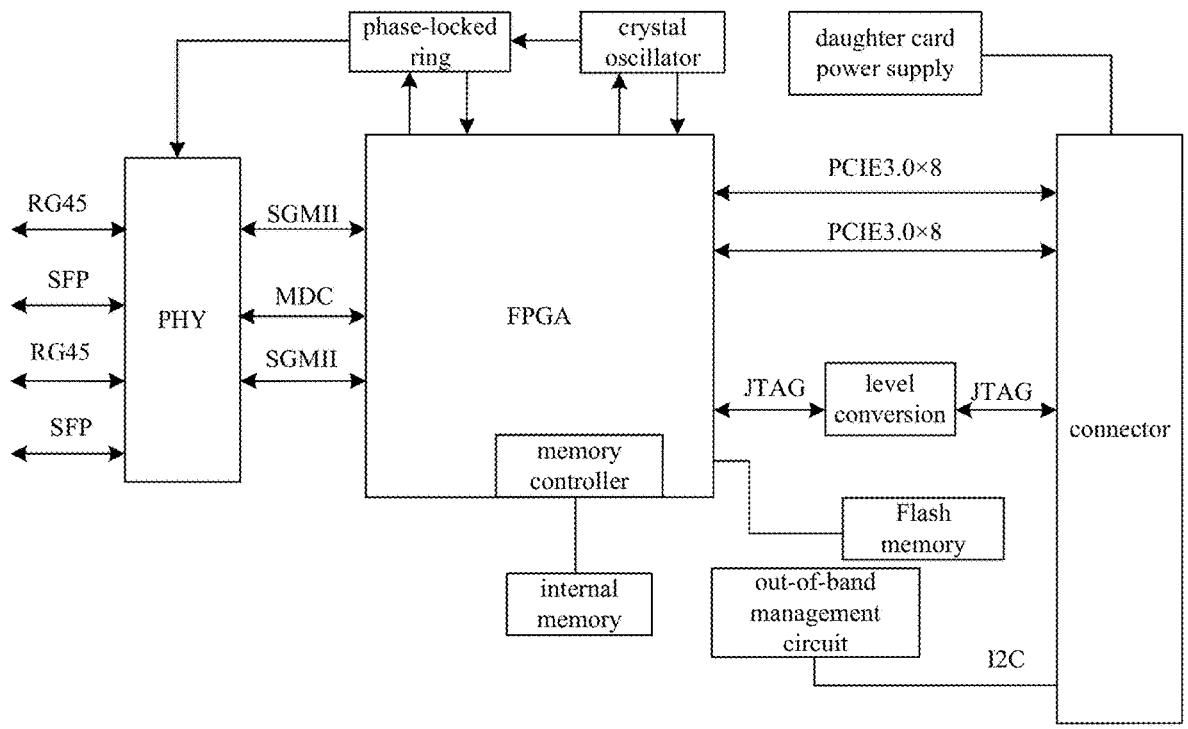
FIG. 4 is another schematic diagram of a network card according to an embodiment of the present application.

FIG. 4 illustrates an embodiment of the network card. In addition to including the above components, the network card may further include an out-of-band management circuit configured to provide an out-of-band management function via an I2C bus. The FPGA includes a memory controller configured to store and execute instructions obtained based on FPGA programming, such as an instruction of transmitting the synchronized time information to each of the plurality of VMs which are run on the host. The instructions may also perform hardware assisted functions, such as PTP message processing, time information maintenance, time synchronization, and timing step adjustment, so as to cooperate with host-side software to complete time synchronization in the VMs. A physical (PHY) device is configured to lead RJ45 electrical ports and SFP optical ports out to a panel. A JTAG debug interface is configured to be used for debugging and first load of a version. Both of a Flash memory and an internal memory may be configured to store instructions or data, for example, firmware versions of the network card are stored in the Flash memory. A daughter card power supply is a power module of network card, and is configured to supply power to the network card.

Figure 5:
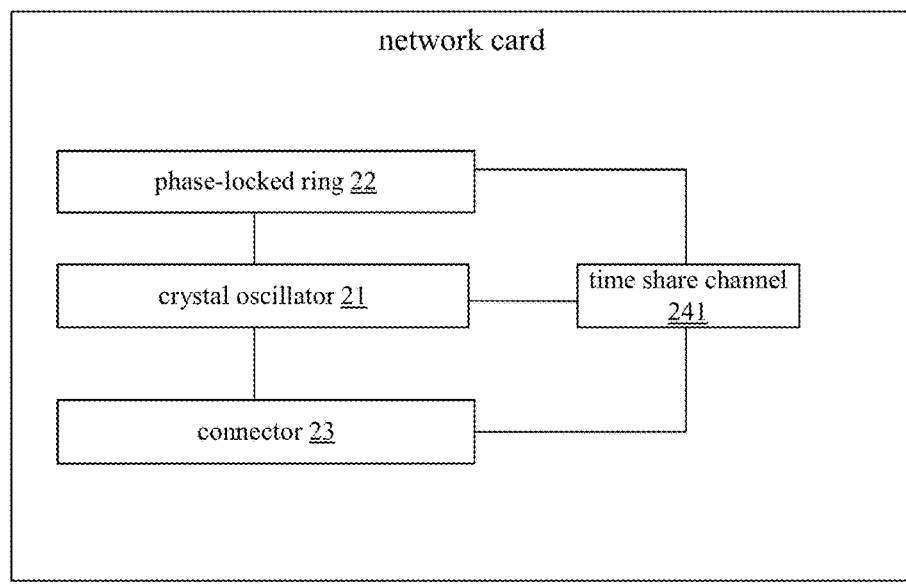
FIG. 5 is a schematic diagram of an expanded network card according to an embodiment of the present application.

In an embodiment of the network card, the network card includes: a crystal oscillator configured to generate a clock pulse signal; a phase-locked loop configured to provide a local clock source for the network card according to the clock pulse signal; and a connector connected with a host. The network card may further include a programmable logic device configured to synchronize time with a server to obtain synchronized time information, and transmit the synchronized time information to each VM through a shared memory channel (e.g., a shared memory channel which connects the host to each VM). FIG. 5 is a schematic diagram of a network card, which expands an existing network card to add a time share channel 241 in the existing network card, so that synchronized time information may be transmitted to each VM through the time share channel 241, that is, transmitting the synchronized time information to each VM by means of sharing a memory.

Figure 6:
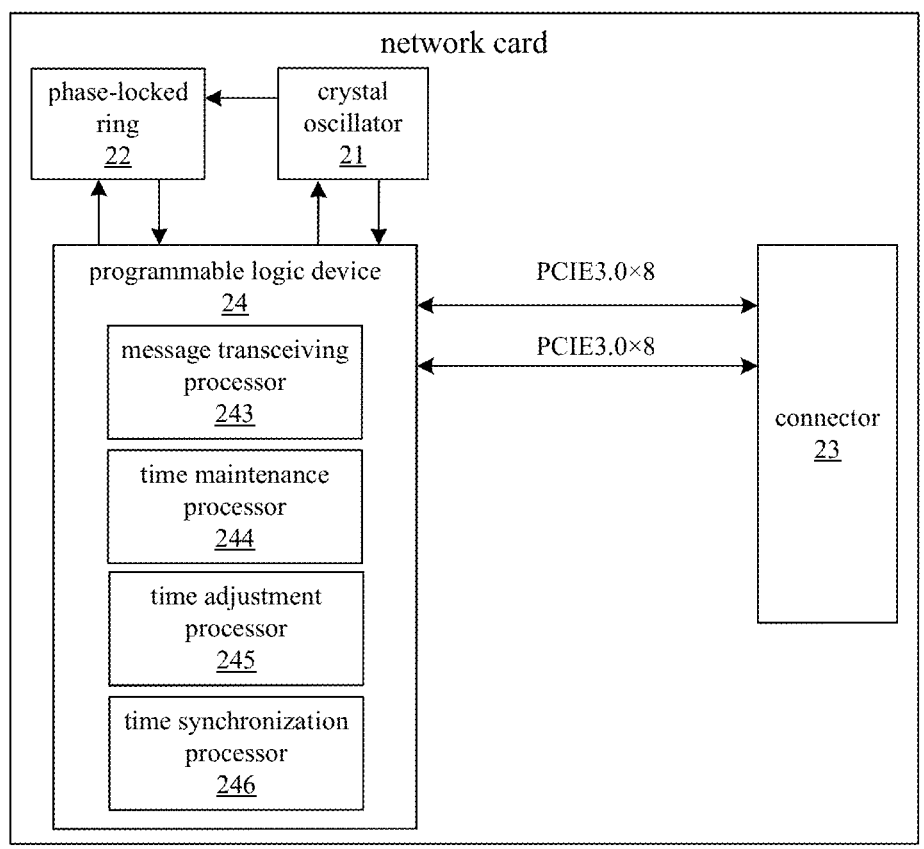
FIG. 6 is a schematic diagram of an intelligent network card according to an embodiment of the present application.

In an embodiment of the network card, the network card includes: a crystal oscillator configured to generate a clock pulse signal; a phase-locked loop configured to provide a local clock source for the network card according to the clock pulse signal; and a connector connected with a host. The network card may further include a programmable logic device configured to obtain a timing step according to PTP messages transmitted and received between the host and a server, obtain time update information according to the timing step, and transmit the time update information to each VM as synchronized time information. According to the embodiment of the present application, the programmable logic device may include: a message transceiving processor configured to identify the PTP messages transmitted and received between the host and the server; a time maintenance processor configured to maintain local time of the network card; a time adjustment processor configured to synchronize time according to the PTP messages so as to obtain an adjusted timing step; and a time synchronization processor configured to update the maintained local time of the network card in real time according to the timing step so as to obtain time update information, so that the time update information may be transmitted to each VM as the synchronized time information. FIG. 6 is a schematic diagram of a new intelligent network card, a message transceiving processor 243, a time maintenance processor 244, a time adjustment processor 245, and a time synchronization processor 246 are added in the FPGA, and the synchronized time information is transmitted to each VM with the above logic processing function modules by means of SR-IOV hardware virtualization.

In view of the problem of the standard network card that IEEE 1588 V2 time synchronization can be supported only in a single PF module and thus cannot be used in the VMs to achieve high time synchronization accuracy, according to the above embodiments of the present application, the time of the network card is shared between the host and each VM deployed on the host, which overcomes the limitation of the support for time synchronization of the standard network card, and the synchronized time information is shared by the plurality of VMs through the VF modules by means of memory sharing or SR-IOV hardware virtualization (a hardware assisted way based on SR-IOV). The synchronization between the VMs and the PTP time server realized based on the network card deployed on the host occupies few VM resources, enables the plurality of VMs to carry out high-precision time synchronization through the IEEE 1588 V2 protocol, and greatly increases the accuracy to a nanosecond level or a higher level (such as a picosecond level). Time accuracies are classified according to time measurement requirements of various users, and is a way of measuring. The time accuracies can be classified to be at the levels of nanoseconds, picoseconds, microseconds, milliseconds, seconds, minutes, hours, etc., and the accuracy level higher than the nanosecond level is the picosecond level, with 1,000 picoseconds equaling 1 nanosecond.

As described in the subsequent embodiments of the present application, the network card may also be referred to as a time synchronization acceleration card, or an acceleration card for short.

The network card may include a plurality of functional partitions, that is, one PF module and a plurality of VF modules, time information is stored in each functional partition, the time information in all of the PF module and the VF modules is refreshed in every timing period, and a VM may directly access the time information in a VF module. The hardware form of the network card is not limited, so that the network card may be an independent acceleration card having a PTP time synchronization function, or a standard network card having an expanded PTP clock synchronization function, or an intelligent network card into which a PTP clock synchronization function is incorporated.

In the embodiments of the present application, the message transceiving processor is further configured to add timestamps to the PTP messages or extract timestamps from the PTP messages. The time adjustment processor is further configured to collect time deviation occurring during the periodical transmitting and receiving of the PTP messages between the host and the server according to the duration of a period, so as to obtain the adjusted timing step according to the time deviation. The duration of a period may be selected according to a target synchronization accuracy required by the time synchronization and/or system load.

In the embodiment of the present application, the time adjustment processor is further configured to obtain the adjusted timing step according to the time deviation after a local timing period is reached and time synchronization and update is triggered. The local timing period is less than the target synchronization accuracy required by the time synchronization, and may be set to the nanosecond level or a higher level.

In an embodiment of the present application, the time maintenance processor is further configured to maintain the local time of the network card according to the local clock source.

Figure 7:
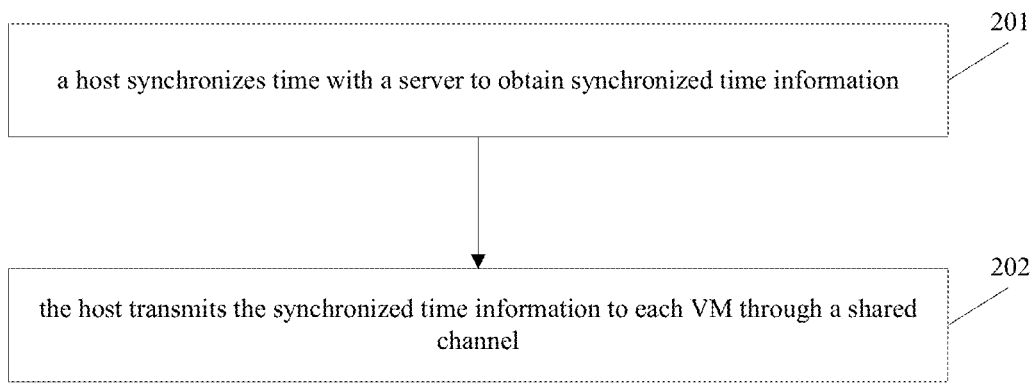
FIG. 7 is a flowchart illustrating a time synchronization method according to an embodiment of the present application.

An embodiment of the present application provides a time synchronization method applied to a host on which N (N≥2) VMs are run, as shown in FIG. 7. The method includes steps 201 and 202.

In step 201, a host synchronizes time with a server to obtain synchronized time information.

In step 202, the host transmits the synchronized time information to each VM through a shared channel.

The accuracy achieved by using the synchronized time information is at the nanosecond level or a higher level (such as the picosecond level).

The host may transmit the synchronized time information to each VM through the shared channel in response to an acquisition request periodically triggered by each VM.

In an embodiment of the present application, the step 202 may include transmitting the synchronized time information to each VM through a shared memory channel, which connects the host to each VM, in response to an acquisition request periodically triggered by each VM.

In the embodiment of the present application, each of the N (N≥2) VMs which are run on the host sends an acquisition request to the host periodically, receives the synchronized time information transmitted thereto by the host through the shared channel, and corrects the local system time thereof according to the synchronized time information. The synchronized time information may be obtained by the time synchronization of the host with the server.

In the embodiment of the present application, the step of receiving the synchronized time information transmitted to each VM by the host may include: receiving the synchronized time information through the shared memory channel which connects the host to each VM.

Figure 8:
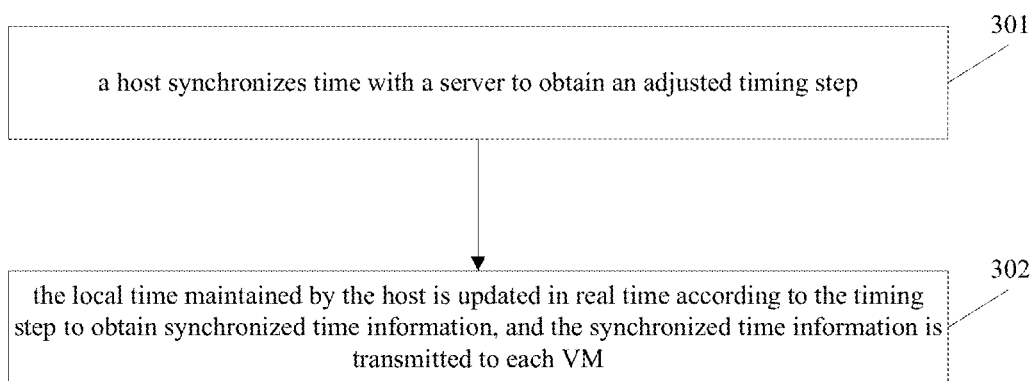
FIG. 8 is another flowchart illustrating a time synchronization method according to an embodiment of the present application.

An embodiment of the present application provides a time synchronization method applied to a host on which N (N≥2) VMs are run, as shown in FIG. 8. The method includes steps 301 and 302.

In step 301, a host synchronizes time with a server to obtain an adjusted timing step.

The host may synchronize time with the server to obtain PTP messages containing timestamps, extract the timestamps from the PTP messages, obtain time deviation between the host and the server according to the timestamps, and obtain the adjusted timing step according to the time deviation.

In step 302, the local time maintained by the host is updated in real time according to the timing step to obtain synchronized time information, and the synchronized time information is transmitted to each VM.

The local time maintained by the host may be updated in real time according to the timing step in response to an acquisition request periodically triggered by each VM, so as to obtain time update information, and the time update information is transmitted to each VM as the synchronized time information.

The accuracy achieved by using the synchronized time information is at the nanosecond level or a higher level (such as the picosecond level).

In the embodiment of the present application, each VM periodically sends an acquisition request to the host, and the adjusted timing step is obtained after the host synchronizes time with the server. The timing step may be obtained according to the time deviation obtained by the time synchronization of the host with the server. The synchronized time information transmitted to each VM by the host is received, and the local system time in each VM is corrected according to the synchronized time information. The local time maintained by the host may be updated in real time according to the timing step to obtain the time update information, which is used as the synchronized time information.

Figure 9:
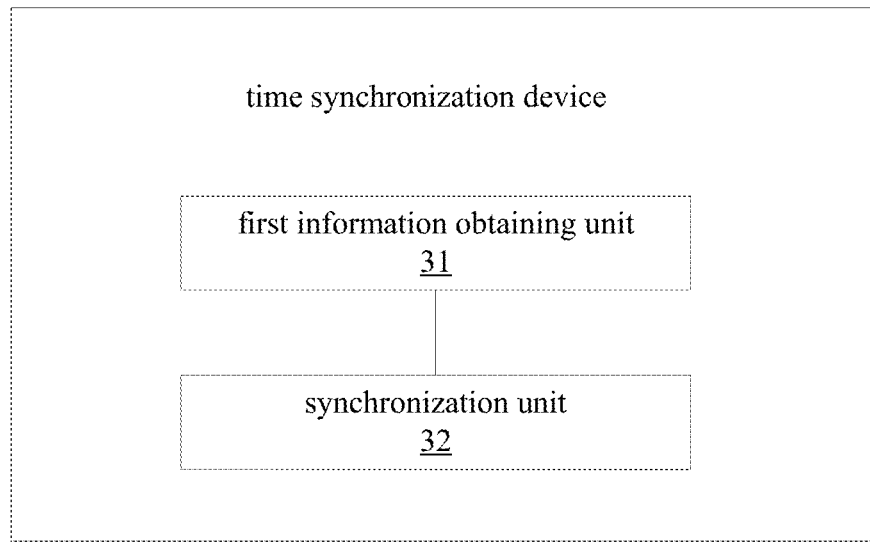
FIG. 9 is a schematic diagram of modules of a time synchronization device according to an embodiment of the present application.

As shown in FIG. 9, an embodiment of the present application provides a time synchronization device, including: a first information obtaining unit 31 configured to synchronize time with a server to obtain synchronized time information; and a synchronization unit 32 configured to transmit the synchronized time information to each VM through a shared channel. The accuracy achieved by using the synchronized time information is at the nanosecond level or a higher level.

In the embodiments of the present application, the synchronization unit is further configured to transmit the synchronized time information to each VM through a shared memory channel, which connects the host to each VM, in response to an acquisition request periodically triggered by each VM.

In the embodiments of the present application, the device further includes: a receiving unit configured to receive the synchronized time information transmitted to each VM by the host; and a correcting unit configured to correct the local system time in each VM according to the synchronized time information.

In the embodiments of the present application, the device further includes a first obtaining unit configured to periodically send an acquisition request to the host, so as to obtain the synchronized time information by the time synchronization of the host with the server. The receiving unit is further configured to obtain the synchronized time information through the shared memory channel which connects the host to each VM.

Figure 10:
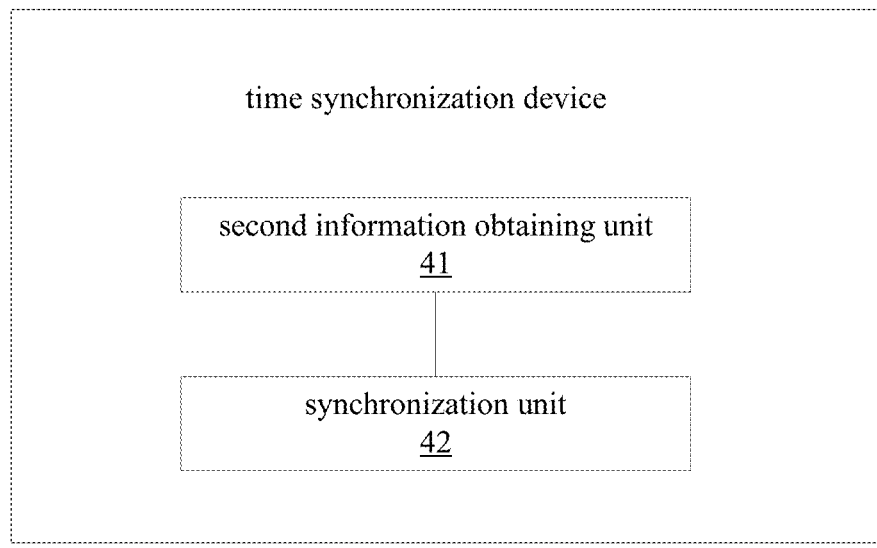
FIG. 10 is another schematic diagram of modules of a time synchronization device according to an embodiment of the present application.

As shown in FIG. 10, an embodiment of the present application provides a time synchronization device, including: a second information obtaining unit 41 configured to synchronize time with a server to obtain an adjusted timing step; and a synchronization unit 42 configured to transmit synchronized time information to each VM through a shared channel. The accuracy achieved by using the synchronized time information is at the nanosecond level or a higher level.

In the embodiments of the present application, the second information obtaining unit is further configured to synchronize time with the server to obtain PTP messages containing timestamps, extract the timestamps from the PTP messages, obtain time deviation between the host and the server according to the timestamps, and obtain the adjusted timing step according to the time deviation.

In the embodiments of the present application, the synchronization unit is further configured to update the local time maintained by the host according to the timing step in response to an acquisition request periodically triggered by each VM to obtain time update information, and transmit the time update information to each VM as the synchronized time information.

In the embodiments of the present application, the device further includes a second obtaining unit configured to periodically send an acquisition request to the host, and obtain the adjusted timing step after the host synchronizes time with the server, so as to update the local time maintained by the host in real time according to the timing step to obtain the synchronized time information. The timing step may be obtained according to the time deviation obtained by the time synchronization of the host with the server.

In the embodiments of the present application, the receiving unit is further configured to receive the time update information obtained by updating the local time maintained by the host in real time according to the timing step, so as to transmit the time update information as the synchronized time information.

Figure 11:
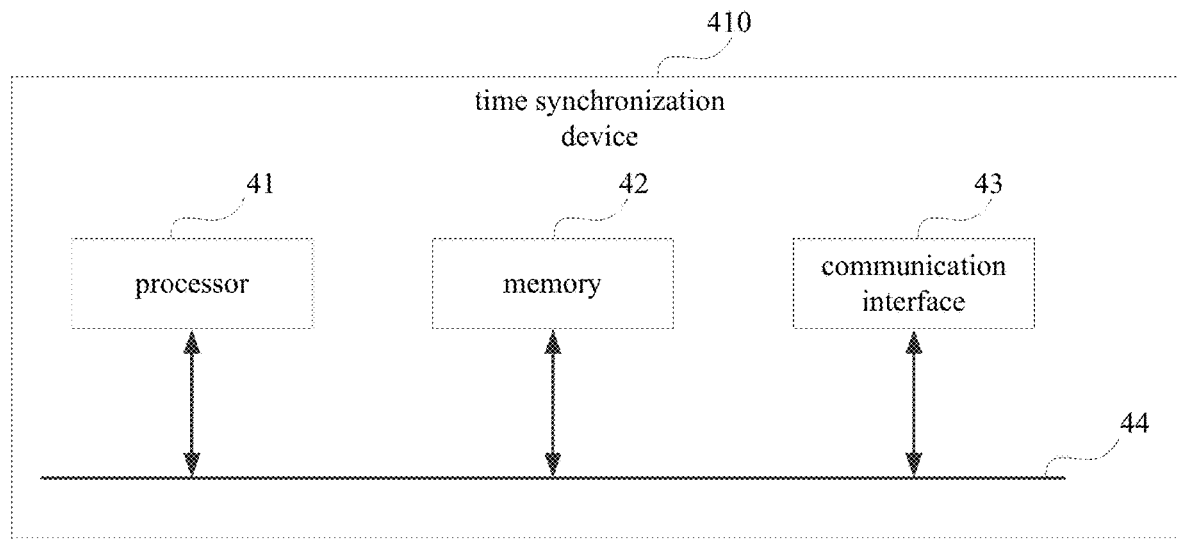
FIG. 11 is a schematic diagram of a hardware structure of a time synchronization device according to an embodiment of the present application.

An embodiment of the present application provides a time synchronization device, as shown in FIG. 11, a time synchronization device 410 includes a processor 41, and a memory 42 configured to store a computer program capable of being run on the processor 41. As shown in FIG. 11, the time synchronization device 410 may further include at least one communication interface 43. All the components in the time synchronization device 410 are coupled together through a bus system 44. It should be understood that the bus system 44 is configured to implement connection and communication among the components. In addition to including a data bus, the bus system 44 may include a power bus, a control bus, and a status signal bus. For the purpose of clear illustration, the various buses are labeled as the bus system 44 in FIG. 11. The communication interface 43 is configured to interact with the other devices.

It should be understood that the memory 42 may be a volatile memory or a nonvolatile memory, and may include both volatile and nonvolatile memories. The nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a Flash Memory, a magnetic surface memory, an optical disc, or a Compact Disc Read-Only Memory (CD-ROM); and the magnetic surface memory may be a disk memory or a tape memory. The volatile memory may be a Random Access Memory (RAM) serving as an external cache. Illustratively but not restrictively, many forms of RAMs may be used, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 42 described in the embodiments of the present application is intended to include, but is not limited to, the above and any other suitable types of memories.

An embodiment of the present application provides a computer-readable storage medium configured to store the computer programs of the above embodiments, so as to perform the time synchronization methods according to the embodiments of the present application. The computer-readable storage medium may be an FRAM, an ROM, a PROM, an EPROM, an EEPROM, a Flash Memory, a magnetic surface memory, an optical disk, or a CD-ROM, and may be various devices including one or any combination of the above memories.

It should be noted that the technical solutions described in the embodiments of the present application may be arbitrarily combined if no conflict is incurred.

Figure 12:
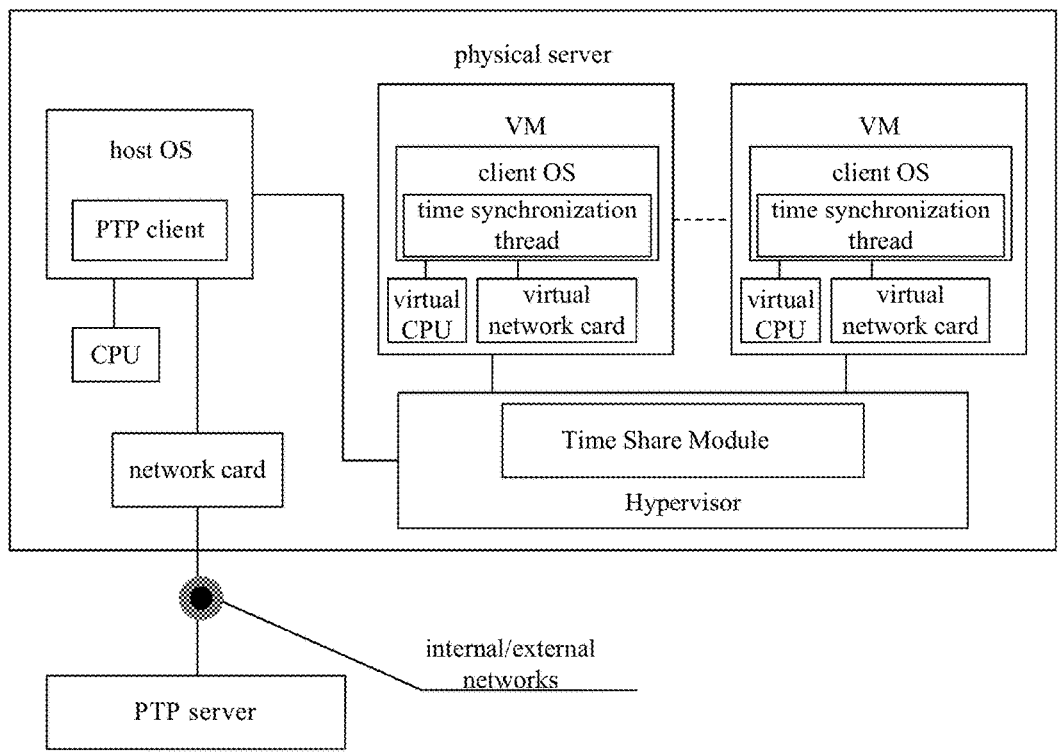
FIG. 12 is a schematic diagram of a system architecture which adopts a solution of memory sharing of the embodiments of the present application.

As for the above implementation of the embodiments of the present application, the solution of memory sharing efficiently shares the synchronized time information in the network card with each VM, and allows sharing of the time of the network card between the host and the VM based on the standard network card, without changing the hardware. Based on the existing network card, the host runs the protocol to synchronize time with the PTP server, and obtains the time of the network card directly. As shown in FIG. 12, the shared memory channel, such as a Time Share Module, is added to a Hypervisor so as to transfer time information between the VM and the host. The VM periodically acquires the time from the shared memory to correct the system time. The Hypervisor is an intermediary software layer running between a physical server and an operating system, and allows a plurality of operating systems and applications to share a set of basic physical hardware, so that it may be regarded as a "meta" operating system in a virtualized environment, may coordinate all physical devices and VMs which access the server, and is also known as a virtual machine monitor. The Hypervisor is the core of all virtualization technologies. A fundamental function of the hypervisor is supporting multi-workload migrations without interruption. When the server is started and the Hypervisor is run, each VM is allocated a proper amount of memory, CPU, network and disk, and client operating systems of all the VMs are loaded.

Figure 13:
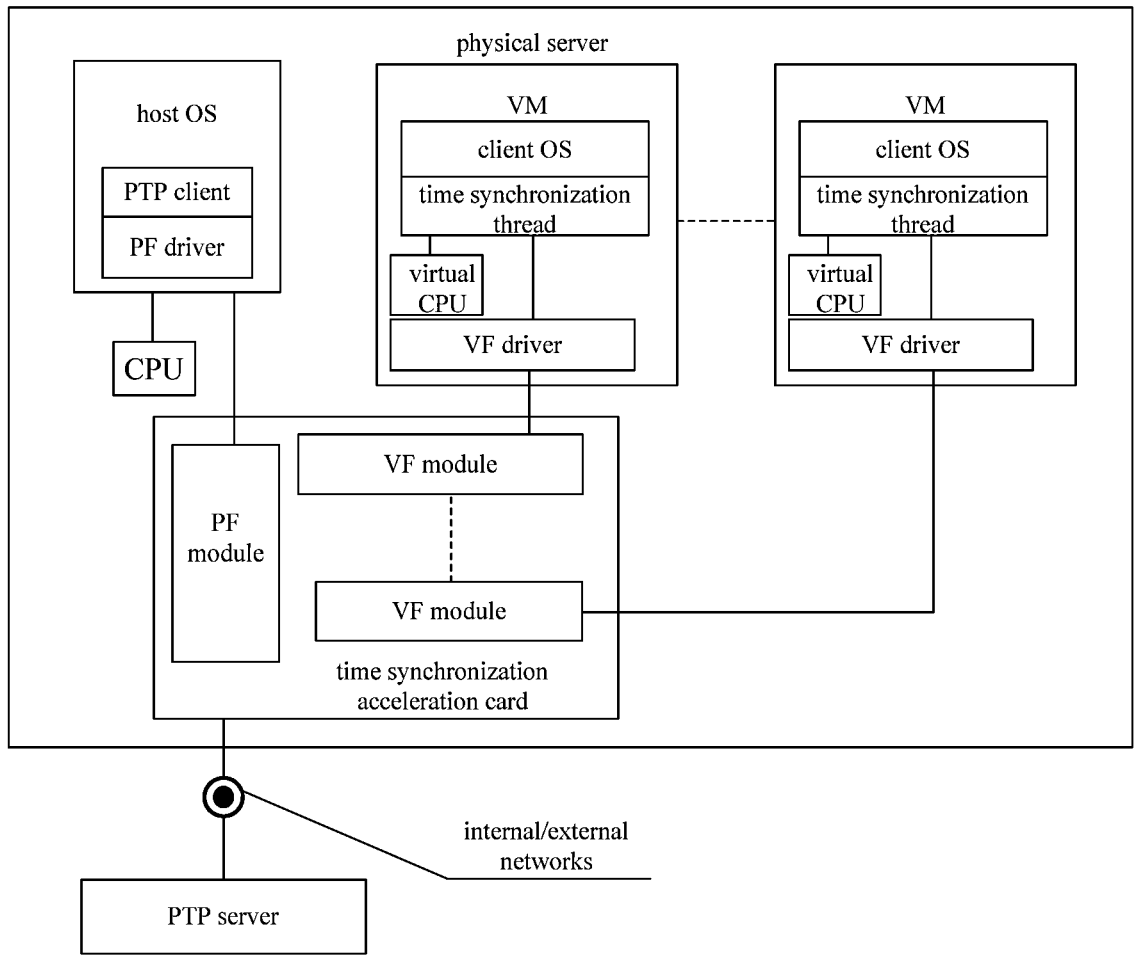
FIG. 13 is a schematic diagram of a system architecture which adopts a solution of Single Root I/O Virtualization (SR-IOV) of the embodiments of the present application.

As for the above implementation of the embodiments of the present application, the synchronization by means of SR-IOV hardware virtualization efficiently shares the synchronized time information in the network card with each VM, and may adopt the time synchronization acceleration card (the acceleration card for short) which may be implemented in the form of a network card. The host synchronizes with the time server based on the acceleration card by using IEEE 1588 V2. Inside the acceleration card, the updated time information is automatically distributed to the plurality of VF modules, so that each VM may directly access the updated time information. The acceleration card has the functions of identifying PTP synchronization messages, automatically adding timestamps, maintaining local time, and providing adjusted timing steps. As shown in FIG. 13, the time of the acceleration card is distributed to the VF modules through the synchronization by means of SR-IOV hardware virtualization, so that the synchronization accuracy is improved. The host runs the protocol to synchronize time with the PTP server, and the timing step is adjusted according to the time deviation between the acceleration card and the server in every synchronization period. The acceleration card counts time at an adjusted frequency and updates the time information in the VF modules in real time. The VMs periodically acquire the time information from the VF modules to correct their system time.

By the above two solutions (that is, the solution of memory sharing and the solution of SR-IOV hardware virtualization), the synchronized time information in the acceleration card (which may be implemented as a network card) may be efficiently shared with each VM. Both solutions adopt the PTP to continuously correct the time of the VM, so as to improve the synchronization accuracy, thereby eliminating the time drift in the VM. In order to realize time synchronization in the VMs, the time of a clock server may be automatically acquired through the PTP and is used as a reference source to adjust the time of the VM, which needs no preset processes and improves the synchronization accuracy.

The solution of memory sharing allows sharing of the time of the network card between the host and the VM based on the standard network card, without changing the hardware; and the solution of SR-IOV hardware virtualization needs the addition of new hardware, and may increase the synchronization accuracy to the nanosecond level, so that high-precision time synchronization in the VM is realized. The acceleration card may be designed based on SR-IOV hardware virtualization, and may be obtained by expanding a programmable device based on a standard network card, or by adding functions based on an intelligent network card. The PTP is run on the host, and the acceleration card only needs to distribute the synchronized time information to different VFs, which occupies fewer resources, and ensures consistency of the time of all the VMs on the host. The acceleration card may be implemented as an intelligent network card, so that the host may synchronize with the time server based on the intelligent network card by using IEEE 1588 V2. Inside the intelligent network card, the updated time information is automatically distributed to a plurality of VF modules, so that each VM may access the updated time information directly. The intelligent network card may include one PF module and the plurality of VF modules, each VF module is implemented as an independent PCIE device, and the time information is shared between the PF module and each VF module. A VM adjusts the local system time according to the time information of the corresponding VF module acquired at regular time. The intelligent network card may be deployed in a PCIE slot of a standard server, and includes: an Ethernet message transceiving module for transmitting and receiving messages like a standard network card; a PTP message timestamping function module configured to identify PTP event messages, and add transmission and reception timestamps; a timing module used as a clock source of network card to maintain local time; a timing step adjusting module, with which a user may adjust local timing frequency so as to allow software to adjust the local time according to a PTP synchronization result; and a time distribution module configured to distribute time update information to all of the plurality of VF modules which are included in the network card. With the intelligent network card, when a user creates a VM client, the VM client is bound with a VF module of the network card, and the software in the VM client periodically acquires the time information from the VF module to adjust the system time of the VM client. The time synchronization accuracy of the VM achieved based on the intelligent network card may reach the nanosecond level.

The application scenarios where the embodiments of the present application are implemented are illustrated below by examples.

Figure 14:
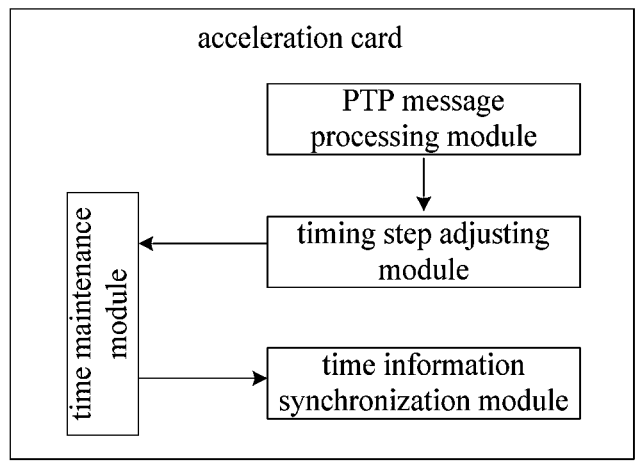
FIG. 14 is a schematic diagram of internal functional modules of an acceleration card, which adopts a solution of SR-IOV of the embodiments of the present application and synchronizes time by using a Precision Time Protocol (PTP)

By the examples, a method of sharing the PTP time synchronization information of the network card between the host and the VM is emphasized, and includes two implementation solutions: a solution of memory sharing based on a common network card, and an solution of SR-IOV-based clock synchronization acceleration card. An SR-IOV-based clock synchronization acceleration card may allow the time obtained after IEEE 1588 V2 synchronization to be shared between the host and each VM through hardware. As shown in FIG. 14, the acceleration card includes a PTP message processing module, a time maintenance module, a timing step adjusting module, and a time information synchronization module. Based on the acceleration card, the user runs the PTP on the host and time synchronization is performed between the acceleration card and the PTP server. When the user creates a VM, the VM is bound to a VF of the acceleration card. The VM periodically acquires the time information from the bound VF to adjust the system time of the VM. The PTP message processing module is configured to identify PTP messages passing through the acceleration card, and add and extract timestamps. The time maintenance module is provided with a clock source therein to maintain local time. The timing step adjusting module is configured to adjust local timing steps so as to perform the function of adjusting a clock frequency. The acceleration card includes a plurality of functional partitions, that is, one PF module and a plurality of VF modules, time information is stored in each functional partition, the time information synchronization module refreshes the time information in all of the PF module and the VF modules in every timing period, so that the VM may directly access the time information in a VF module to perform time synchronization. The hardware form of the acceleration card is not limited in the examples, so that the acceleration card may be an independent acceleration card having a PTP time synchronization function, or a standard network card having an expanded PTP clock synchronization function, or an intelligent network card into which a PTP clock synchronization function is incorporated.

In the examples, the PTP synchronization time information is shared between the host and the VM by two solutions, that is, the solution of memory sharing, and the solution of SR-IOV-based clock synchronization acceleration card.

As shown in FIG. 12, the solution of memory sharing may be implemented based on the existing network card. The host runs the protocol to synchronize time with the PTP server, and obtains the time of the network card directly. The shared memory channel is added to the Hypervisor so as to transfer time information between the VM and the host. The VM may periodically acquire the time from the shared memory to correct the system time.

As shown in FIG. 13, the solution of SR-IOV-based clock synchronization acceleration card distributes the time of the network card to each VF module through hardware, so that the synchronization accuracy is improved. The host runs the protocol to synchronize time with the PTP server, and the timing step is adjusted according to the time deviation between the acceleration card and the server in every synchronization period. The network card counts time at an adjusted frequency and updates the time information in the VF modules in real time. The VMs periodically acquire the time information from the VF modules to correct their system time. The corresponding process includes: running the PTP on the host to periodically synchronize with the PTP server; calculating the time deviation and storing the time deviation in the acceleration card; adjusting a local timing step by the acceleration card according to the time deviation; updating the time information in the VF in real time according to the local timing step (e.g., the adjusted timing frequency) to obtain the time update information; and obtaining time (e.g., the time update information) by the VM from the acceleration card, and adjusting the system time of the VM.

In the examples, the PTP is run on the host, the timing step of the acceleration card is periodically adjusted, the time information in the acceleration card is continuously updated, and each VM periodically acquires the time of the acceleration card to adjust the system time of the VM. The whole interaction process is divided into three parts.

Figure 15:
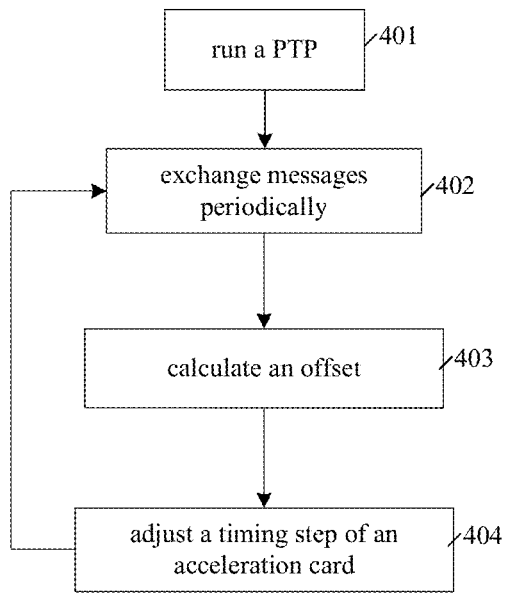
FIG. 15 is a flowchart illustrating performing synchronization by an acceleration card with a PTP server according to the embodiments of the present application.

In the first part, the acceleration card adjusts the timing step, as shown in FIG. 15.

In step 401, the PTP is run on the host.

In step 402, messages are exchanged with the PTP server periodically. The duration of a period may be selected based on target synchronization accuracy and system load.

In step 403, the time deviation between the acceleration card and the PTP server is calculated in every period.

In step 404, the timing step of the acceleration card is adjusted according to the time deviation to correct the local time of the acceleration card, so as to keep the acceleration card at the same frequency and the same phase as the PTP time server.

Figure 16:
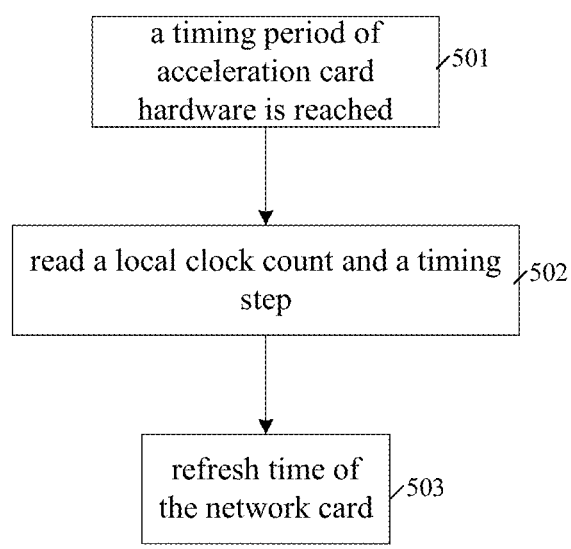
FIG. 16 is a flowchart illustrating updating internal time of an acceleration card according to the embodiments of the present application.

In the second part, the time of the acceleration card is refreshed, as shown in FIG. 16.

In step 501, time update is triggered by a local timing period, which refers to a timing period of the acceleration card hardware, is smaller than the target accuracy, and may be set to several nanoseconds.

In step 502, a local clock count and the updated timing step are read to calculate current time.

In step 503, the time of the network card is refreshed, which includes refreshing the time of the PF module and the VF modules.

Figure 17:
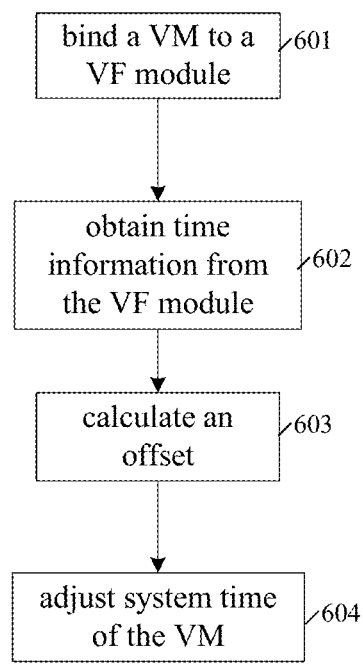
FIG. 17 is a flowchart illustrating adjusting VM system time according to the embodiments of the present application.

In the third part, the time of a VM is corrected, as shown in FIG. 17.

In step 601, when a VM is created, the VM is bound to a VF module of the acceleration card.

In step 602, the VM periodically obtains the local system time and the time information in the VF module. The duration of a period may be selected based on required synchronization accuracy and the system load.

In step 603, the time deviation between the system time and the time of the acceleration card is calculated.

In step 604, the local timing frequency of the VM is adjusted according to the time deviation.

An adjustment coefficient of the system time of the VM relative to the reference time may be determined by the following method.

If the time deviation is a negative number, a ratio of a length of adjustment time and an absolute value of the time deviation to the length of adjustment time is calculated, and the ratio is taken as the adjustment coefficient; and if the time deviation is a positive number, a ratio of a difference between the length of adjustment time and the absolute value of the time deviation to the length of adjustment time is calculated, and the ratio is taken as the adjustment coefficient, and time synchronization is performed by adjusting a system clock frequency of the VM. The time of the VM does not jump greatly, so that the orders of executing time-dependent services on the VM are not changed, that is, the time-sensitive services, such as databases, on the VM are not affected. Moreover, in the time synchronization process, which is independent of PTP service, the services are not interrupted during the operation of the VM, and smooth adjustment of the VM time may be realized no matter how large or small the time deviation is.

If implemented in the form of a software functional module and sold or used as an independent product, the above device in the embodiment of the present application may be stored in a computer-readable storage medium. Based on such understanding, the technical solutions of the embodiment of the present application may be implemented in the form of a software product, which is stored in a storage medium and includes several instructions to enable a computer device (which may be a personal computer, a server, or a network device) to execute all or part of the method described in each embodiment of the present application. The storage medium includes various media capable of storing program codes, such as a USB flash drive, a Read-Only Memory (ROM), a magnetic disk, or an optical disc. Thus, the embodiments of the present application are not limited to any specific combination of hardware and software.

Although the exemplary embodiments of the present application have been disclosed for illustrative purposes, it should be noted by those skilled in the art that various modifications, additions and substitutions are possible, so that the scope of the present application should not be limited to the above embodiments.

What is claimed is:

1. A network card, comprising:
a crystal oscillator configured to generate a clock pulse signal;
a phase-locked loop configured to provide a local clock source for the network card according to the clock pulse signal; and
a connector connected with a host,
wherein the network card comprises one physical function (PF) module and N virtual function (VF) modules, each of N virtual machine (VMs) which are run on the hose is bound with a corresponding VF module among the N VF modules, where N≥2,
the network card synchronizes time with a server to obtain synchronized time information based on the local clock source, and distributes the synchronized time information to the PF module and each of the N VF modules, and
each of the N VMs uses the synchronized time information in the corresponding VF module bounded with itself.

2. The network card of claim 1, further comprising a programmable logic device configured to:
obtain a timing step according to Precision Time Protocol (PTP) messages transmitted and received between the host and the server,
obtain time update information according to the timing step, and
transmit the time update information to each VM as the synchronized time information.

3. The network card of claim 2, wherein the programmable logic device comprises:
a message transceiving processor configured to identify the PTP messages transmitted and received between the host and the server;
a time maintenance processor configured to maintain local time of the network card;
a time adjustment processor configured to synchronize time according to the PTP messages so as to obtain the timing step; and
a time synchronization processor configured to update the maintained local time of the network card in real time according to the timing step, so as to obtain the time update information.

4. The network card of claim 3, wherein the message transceiving processor is further configured to add timestamps to the PTP messages or extract the timestamps from the PTP messages.

5. The network card of claim 3, wherein the time adjustment processor is further configured to:
collect time deviation occurring during the periodical transmitting and receiving of the PTP messages between the host and the server according to a duration of a period, so as to obtain the timing step according to the time deviation,
wherein the duration of the period is selected according to a target synchronization accuracy required by the time synchronization and/or system load.

6. The network card of claim 5, wherein the time adjustment processor is further configured to obtain the timing step according to the time deviation after a local timing period is reached and time synchronization and update is triggered.

7. A time synchronization method applied to a host on which N virtual machines (VMs) are run, the host is equipped with a network card including one physical function (PF) module and N virtual function (VF) modules, each of the N VMs is bound with a corresponding VF module among the N VF modules, where N≥2, comprising:
synchronizing times with a server to obtain synchronized time information, and distributing the synchronized time information to the PF module and each of the N VF modules through a hardware logic of the networks; and
using by each of the N VMs, the synchronized time information in the corresponding VF module bounded with itself.

8. The time synchronization method of claim 7, wherein the step of distributing the synchronized time information to the PF module and each of the N VF modules comprises:
obtaining a timing step according to Precision Time Protocol (PTP) messages transmitted and received between the host and a server;
obtaining time update information according to the timing step; and
transmitting the time update information to the PF module and each of the N NF modules as the synchronized time information.

9. The time synchronization method of claim 8, wherein the step of obtaining the timing step according to the PTP messages transmitted and received between the host and the server comprises:
obtaining the PTP messages containing timestamps; and
extracting the timestamps from the PTP messages, obtaining time deviation between the host and the server according to the timestamps, and obtaining the timing step according to the time deviation, and the step of obtaining the time update information according to the timing step comprises:
updating local time maintained by the host in real time according to the timing step in response to an acquisition request periodically triggered by each VM to obtain the synchronized time information.

10. A time synchronization method applied to each of N virtual machines (VMs) which are run on a host, the host is equipped with a network card including one physical function (PF) module and N virtual function (VF) modules, each of the N VMs is bound with a corresponding VF module among the N VF modules, the PF module and each of the N VF modules store synchronized time information, where N≥2, comprising:
accessing by each of the N VMs, the synchronized time information in the corresponding VF module bounded with itself; and
correcting local system time in each of the N VMs according to the synchronized time information.

11. The time synchronization method of claim 10, further comprising:
sending an acquisition request to the host periodically; and
obtaining the synchronized time information by time synchronization of the host with a server and storing the synchronized time information in the PF module and each of the N VF modules.

12. The time synchronization method of claim 10, wherein time update information obtained by updating local time maintained by the host in real time according to a timing step is received as the synchronized time information stored in the PF module and each of the N VF modules.

13. The time synchronization method of claim 12, wherein the timing step is obtained according to time deviation obtained by time synchronization of the host with a server.

14. A time synchronization device, comprising:
a memory having a computer program stored therein; and
a processor configured to execute the computer program to perform the time synchronization method of claim 7.

15. A time synchronization device, comprising:
a memory having a computer program stored therein; and
a processor configured to execute the computer program to perform the time synchronization method of claim 10.

16. A non-transitory computer storage medium having a computer program stored therein, wherein, when the computer program is executed by a processor, the processor performs the time synchronization method of claim 7.

17. A non-transitory computer storage medium having a computer program stored therein, wherein, when the computer program is executed by a processor, the processor performs the time synchronization method of claim 10.

* * * * *